Figure 1:
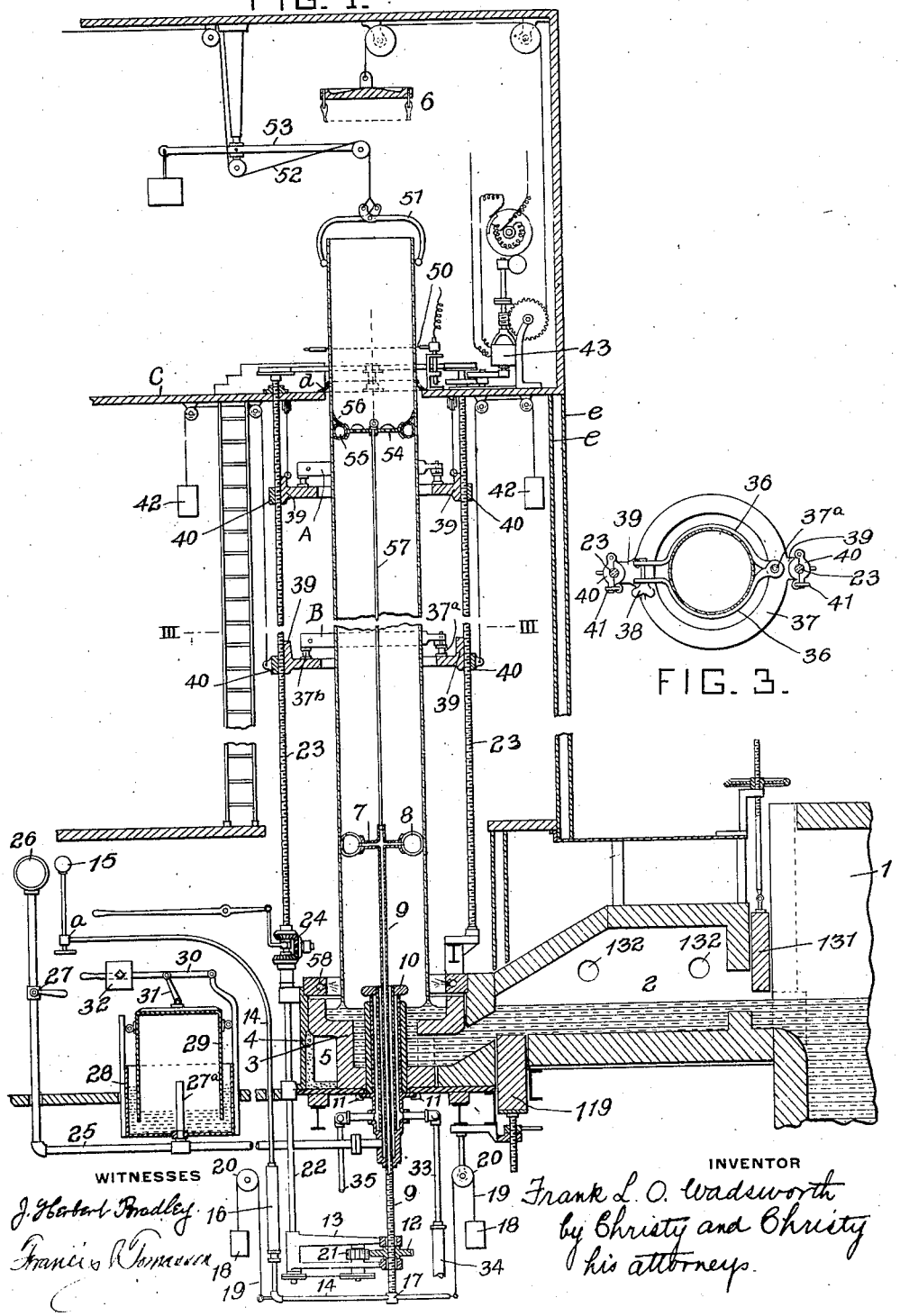

F. L. O. WADSWORTH.
DRAWING GLASS CYLINDERS.
APPLICATION FILED MAR. 12, 1908.
1,166,025.
Patented Dec. 28, 1915.
3 SHEETS—SHEET 2.
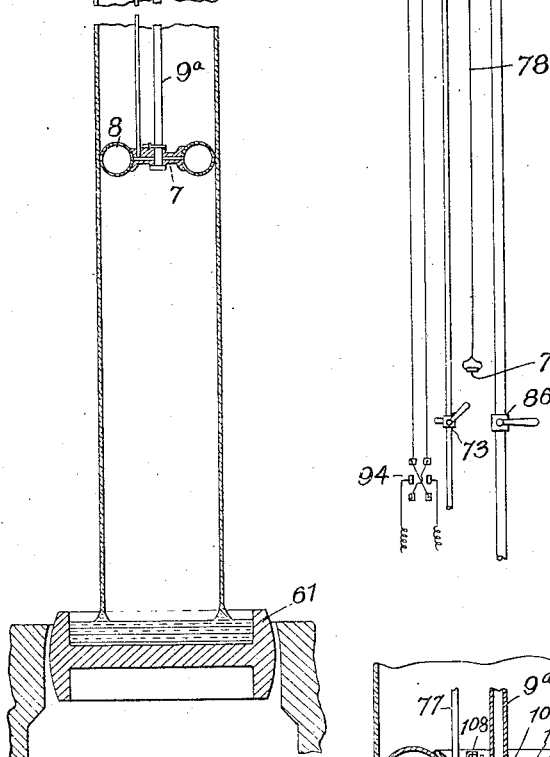
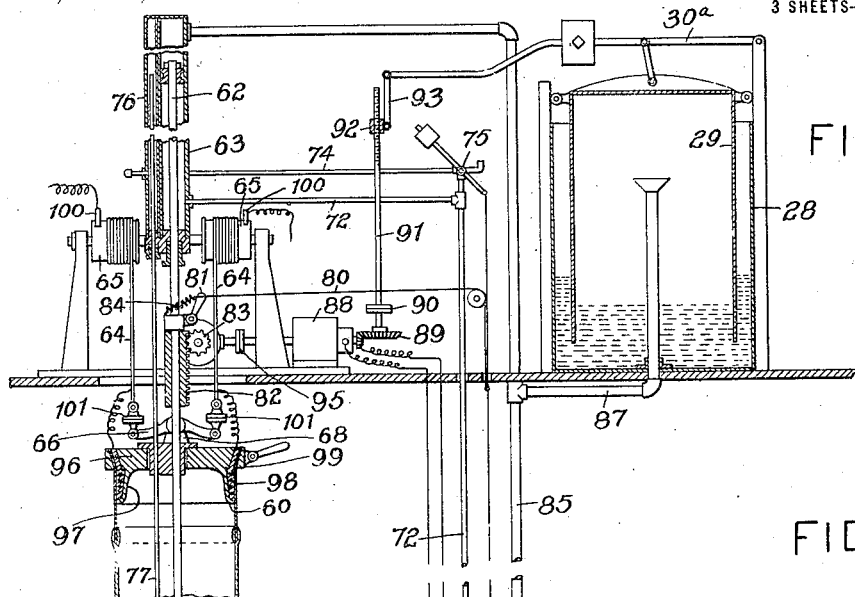
FIG. 2.
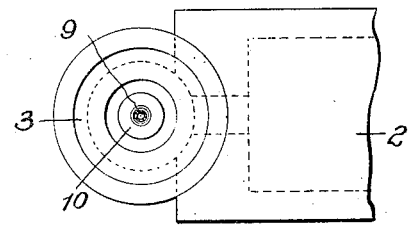
FIG. 5.
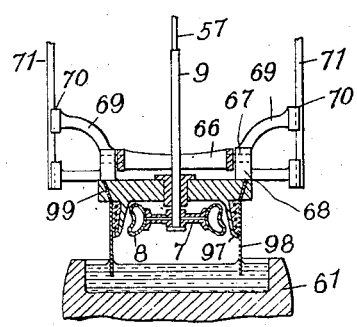
FIG. 4.
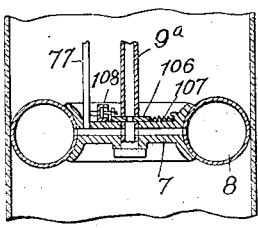
FIG. 6.
WITNESSES
J. Herbert Bradley
Francis J. Tomacek
INVENTOR
Frank L. O. Wadsworth
by Christy and Christy
his attorneys.

F. L. O. WADSWORTH.
DRAWING GLASS CYLINDERS.
APPLICATION FILED MAR. 12, 1908.

1,166,025.

Patented Dec. 28, 1915.
3 SHEETS—SHEET 3.

UNITED STATES PATENT OFFICE.

FRANK L. O. WADSWORTH, OF SEWICKLEY, PENNSYLVANIA.

DRAWING GLASS CYLINDERS.

1,166,025.  Specification of Letters Patent.  Patented Dec. 28, 1915.

Application filed March 12, 1908. Serial No. 420,648.

*To all whom it may concern:*

Be it known that I, FRANK L. O. WADSWORTH, residing at Sewickley, in the county of Allegheny and State of Pennsylvania, a citizen of the United States, have invented or discovered certain new and useful Improvements in Drawing Glass Cylinders, of which improvements the following is a specification.

The invention described herein relates to certain improvements in the drawing of glass cylinders, and has for one object the isolation or inclosure at the beginning of the operation of a mass, or quantity of air or other fluid within a container formed wholly, or in part, by the cylinder being drawn, and then regulating the pressure of such isolated or inclosed fluid, whereby a uniform expansive action determining the internal diameter of the cylinder may be maintained during the entire drawing operation.

The invention is hereinafter more fully described and claimed.

Other objects will appear from the following description.

Figure 7:
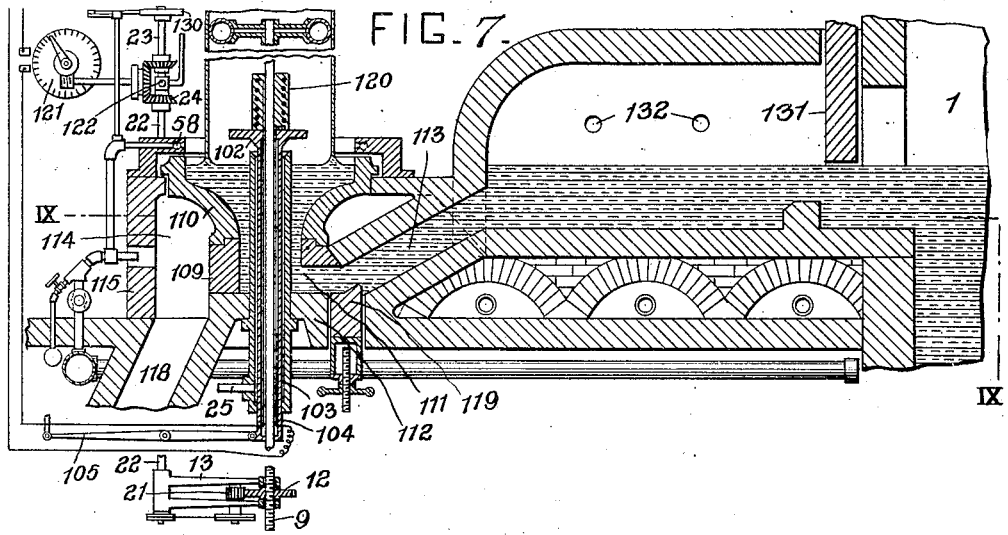

In the accompanying drawings forming a part of this specification, Figure 1 is a sectional elevation of a form of apparatus adapted for the practice of my improved method; Fig. 2 is a similar view showing certain modifications in the construction and combination of the operating parts or elements; Fig. 3 is a sectional plan view on a plane indicated by the line III—III of Fig. 1, showing the clamp for engaging the cylinder; Fig. 4 is a sectional detail view showing parts of the mechanism illustrated in Fig. 2 at the beginning of the formation of a cylinder; Fig. 5 is a plan view showing the relative arrangement of the glass pot or container in Fig. 1 with the forehearth of the melting furnace; Fig. 6 is a sectional view illustrating a modification of the apparatus shown in Fig. 2, showing a construction whereby in the use of such apparatus the fluid container may be formed wholly within the cylinder being drawn; Fig. 7 is a sectional elevation illustrating further modifications of my improvements, in which the pressure within the fluid container is regulated by heat, also showing the fluid container formed wholly within the cylinder being formed.

In the construction shown in Fig. 1, the melting tank 1 is provided with a forehearth in which is formed the dog-house 2 for conducting the glass from the tank to the drawing receptacle or pot 3, which is supported by any suitable means in proper relation to the outlet of the dog-house, as clearly shown. The supporting pocket 4 for the pot or receptacle 3 is so constructed as to form in connection with the pot a chamber 5 into which gas may be introduced for heating the glass within the pot.

At the beginning of the operation the bait 6, which may be of any suitable construction, is lowered down so that its edges are submerged in the glass contained in the pot 3. This bait as shown has a recess in its underside for the reception of a piston or diaphragm 7 having a collapsible periphery formed by a flexible tube 8 of asbestos or other suitable material. This diaphragm is carried by a tube 9 passing down through a plug 10 having annular walls and inserted through an opening in the bottom of the pot so that its upper end will project above the level of the glass in the pot. This plug is surrounded with fire-clay or other resisting material and is removably supported in position by means of clamps 11. The tube 9 has its lower end threaded for the reception of a toothed nut 12, which is normally held stationary as against vertical movement by pivotal arm 13 having forks at their ends for the reception of the threaded rod when the arms are swung into position above and below the nut. The piston or diaphragm 7 has lateral passages connecting the tube 9 with the inflatable periphery of the diaphragm, and the lower end of the tube 9 is detachably connected to a pipe 14 leading to a suitable source of supply of fluid pressure, such for example as the pipe 15. This pipe or connection 14 from the tubular rod 9 to the supply pipe 15 is formed in part by an extensible joint 16, so as to permit of the lower sections of the pipe 14 moving up and down with the tubular rod 9 without breaking the connection with the supply pipe 15. It will be understood of course that other forms of flexible connections can be employed in lieu of the sliding connection or joint 16. The connection between the tubular rod 9 and the pipe 14 consists of a socket 17 carried by the pipe 14, for the reception of the lower end of the tubular piston rod 9. This socket is held up against the end of the piston rod 9 by suitable means, as for example by weights 18 connected by cords 19 passing over guide pulleys 20 to the movable section 14. The toothed nut 12 intermeshes with a pinion 21 carried by the arms 13 and rotated by the shaft 22 through a sprocket chain connection or other suitable means. This shaft is rotated by means of one of the threaded rods 23 employed for shifting the clamps as hereinafter described. The connection between the shaft 22 and rod 23 is formed by a reversible clutch 24 of the usual or any suitable construction, so that although the threaded rod 23 is always rotated in the same direction, the shaft 22 may be rotated in either direction or stopped entirely, as required for the adjustment of the diaphragm 7 as hereinafter described.

The passage in the plug 10 through which the rod 9 passes is connected by a pipe 25 having a regulative valve 27 to a source of fluid supply, as the main 26, leading to any suitable blowing apparatus. This pipe is also connected by a branch 27$^a$ to a gasometer, consisting of a stationary shell 28 and an inverted shell 29 having its lower edge extending below the surface of a liquid contained in the shell 28. When the valve 27 is closed, the pressure of the air or other fluid within the cylinder being formed and below the diaphragm 7 may be varied, by varying the weight of the inverted shell 29. In the construction shown a lever 30 having a fixed fulcrum is connected by a link 31 to the shell 29 and has a weight 32 adjustably mounted thereon.

The plug 10 is prevented from being injuriously heated by the surrounding glass by a cooling fluid supplied through the pipe 33 having an extensible connection 34 to a suitable source, the cooling fluid escaping after circulation through the plug by the pipe 35 having a similar extensible connection.

As before stated, at the beginning of the operation the bait is lowered until its edges are immersed in the glass, the diaphragm 7 at that time resting on the plug 10 and inclosed within the recess in the bait. The tubular periphery of the diaphragm or piston is at this time collapsed. As the bait moves up drawing a shell of glass with it, the piston or diaphragm 7 is also moved up by the rotation of the toothed nut 12. The bait of course continues its movement up, but the upward movement of the piston is arrested by opening the clutch 24 when the piston or diaphragm has attained a desired height within the cylinder being formed. Simultaneously with this arrest of the upward movement of the piston the valve 27 is closed, so that thereafter there will be a fixed mass of air or other fluid in the container, which, in the construction shown in Fig. 1, consists of the portion of the glass cylinder below the piston, the passage through the plug 10, the pipe 25, the valve 27 and the gasometer or collapsible chamber. Simultaneously with the stoppage of movement of the piston the valve $a$ in the pipe 14 is opened, so that fluid pressure will pass through the tubular piston rod 9 into the collapsible periphery of the diaphragm, expanding the same so as to make a tight joint with the inner walls of the glass cylinder. During the remainder of the drawing operation, the pressure in the container—formed as above stated—will be regulated by lowering or raising either the piston 7 or the inverted shell 29 of the gasometer. The gasometer construction permits of the automatic maintenance of any desired pressure within the container, but such pressure can be increased or diminished by shifting the weight 32 on the lever 30.

The drawing of the glass by the bait is continued until a sufficient length has been formed to permit of the application of the upper clamp A shown in Fig. 1. After this clamp has been attached to the cylinder the drawing is continued by the joint action of the bait and clamp until the upper end of the cylinder has risen through the operating floor. The bait can then be cracked off in any suitable manner and the drawing thereafter continued by the alternative use of the clamps A and B. As clearly shown in Figs. 1 and 3, these clamps A and B are similar in construction, and each consists of curved arms 36 pivoted together at one end and adapted to have their opposite ends drawn toward each other to grip the glass by any suitable means, such as a threaded bolt and nut 38. As shown in Fig. 3, the pivot pin of the arms 36 is made annular for the reception of a post 37$^a$ on the supporting ring 37. The annular pivot pin is made larger than the post 37$^a$ and the opposite ends of the arms 36 bear on lugs 37$^b$ projecting from the ring. This construction permits the automatic adjustment of the clamps on the supporting and pulling ring 37. Each ring 37 has lugs 39 formed on its periphery at diametrically opposite points grooved at their outer edges for the reception of the threaded rods 23. Half nuts 40 are pivoted to these lugs and are adapted to be drawn in against the threaded rods by any suitable means as a pivoted link 41, as shown in Fig. 3, thereby locking the ring carrying the clamping arms to the threaded rods, so that said parts will thereafter be moved upward by the screws. The threads of these screws are preferably square in order to allow the clamps to slide smoothly over them when the half nuts 40 are disengaged, and each of the clamps is preferably counterbalanced by means of weights 42.

After the cylinder and the bait have been removed and the first clamp A has risen to a point near the floor C, the second clamp B is engaged with the glass cylinder near its lower end. The first clamp can then be disengaged by opening the arms 36 and the threaded hinged sections 40, and the clamp (A) moved down toward the second clamp B and there again engaged with the glass cylinder. As soon as the upper clamp has been applied, the lower clamp can be in turn released both from the cylinder and from the threaded rods, and also lowered to take a new grip lower down on the cylinder. Thus for most of the time both clamps will engage and will pull together on the cylinder, one near the top and one near the bottom.

The threaded rods 23 are rotated by means of a suitable motor 43, preferably electric, and connected to both of the threaded rods through suitable gearing or sprockets so as to insure the uniform rotation of both threaded rods.

The complete severance of a section from the cylinder can be effected by cracking or cutting the glass. In Fig. 1 I have shown a wire 50 electrically connected to a suitable source and adapted to be drawn around in contact with the cylinder and to move upward therewith when a section is to be severed. As soon as the wire is in contact with the glass a suitable current is passed through the wire ring, heating the same and thereby causing a peripheral crack in the glass. In order to support the severed sections a pair of tongs 51 connected to the hoisting rope 52 and passing around guide pulleys on a swinging arm 53, is connected to the cylinder prior to the cracking off.

In order to prevent any broken glass from dropping down into the cylinder below the line of severance, a protecting diaphragm or piston 54 is provided, having a collapsible periphery 55 and also preferably provided with a flexible apron 56 bearing against the inner walls of the cylinder. This piston is carried by a rod 57 which passes down into the tubular piston rod 9 and it is adapted to be forced up to desired position by fluid pressure in this piston rod. The upward movement of the protecting diaphragm 54 can be limited in any suitable manner, as for example by the formation of a shoulder at the lower end of rod 57 engaging the end wall of the hollow piston rod 9, as shown in Fig. 1. The motor and capping off devices are arranged on an air tight floor C, with an apron d closing the opening between the cylinder and the floor opening. This operating floor is closed off from the furnace by hollow walls e e, forming a comfortable chamber in which the severed sections can be handled.

The construction shown in Fig. 1, while capable of use for drawing short lengths, is especially adapted for the continuous drawing of cylinders. In Fig. 2 I have shown a desirable form of apparatus for drawing single sections. In this construction the bait 60 is lowered down until its edge is immersed in the glass contained in the pot or stool 61. When so lowered the piston or diaphragm 7 is drawn up within a recess in the bait. In this construction the hollow piston rod 9ª passes through the bait and is provided at its upper end with a suitable lifting means, such for example as a piston 62 arranged within a cylinder 63. The bait is connected to a suitable hoisting mechanism, preferably by means of ropes 64 wound on drums 65 and connected to opposite points of the ring 66, which is provided with trunnions arranged 90° from the points of connection of the ropes 64 and mounted in lugs 68 on the bait. This construction will equalize the draft and prevent any irregular pull due to the unequal stretching of the ropes.

As shown in Fig. 4 the bait is provided with arms 69 having grooved portions 70 to engage the guide rods 71 so as to steady the movement of the bait.

The cylinder 63 is connected at a point below the normal travel of the piston 62 to a high fluid pressure supply pipe 72 provided with a three-way valve 73, whereby the flow of fluid pressure to and from the cylinder is controlled. This high pressure line is also connected by a branch 74 having a regulating valve 75 to a cylinder 76, into which projects the upper end of the pipe 77 passing down through the bait and connected to passages in the piston 7 leading to the interior of the hollow flexible periphery 8 of said piston. The lever operating the valve 75 is connected by a rope 78 to a handle 79, said rope being also connected to a branch rope 80 leading to a clamp operating handle 81. This handle is adapted to cause a sleeve 82, provided with teeth intermeshing with the pinion 83, to engage the piston rod 9ª, so that said rod and its piston may be secured at any desired height. When the pull on the handle 79 and on the attached cord or rope 80 is released, the clamp operating handle 81 is returned to its initial position by the spring 84, and the piston rod 9ª is released. The upper portion of the cylinder 63 is connected by a pipe 85 having a valve 86 to a suitable source of fluid, such as air preferably under a slight pressure. This pipe is connected by a branch 87 to a gasometer similar to that described in connection with Fig. 1. In this construction means are provided for shifting the movable shell of the gasometer by means of a motor 88. This means consists of intermeshing beveled pinions 89 driven by the motor, and clutch mechanism 90 connecting the shaft of one of the beveled pinions with the threaded rod 91 which engages a nut 92 connected by a link 93 with the lever 30ª. By throwing this clutch in and out the movable shell of the gasometer can be shifted in accordance with the direction of rotation of the motor, such rotation being controlled by a switch mechanism 94. This motor is also connected through a clutch 95 to the pinion 83 engaging the toothed sleeve 82 on the piston rod 9ª, whereby said rod and its piston 7, when clamped to the sleeve 82 as previously described, may be shifted to vary the pressure of the air in the container during the drawing operation.

In drawing cylinders with this apparatus the bait is lowered so that its edge is immersed in the glass. The diapragm or piston 7 at this time is within a recess in the bait and is collapsed as shown in Fig. 4. The drums 65 are set in motion, winding up the ropes and pulling up the bait and the glass. If the friction between the bait and the piston rod 9ª is not sufficient to draw up the piston 7, fluid pressure is admitted into the cylinder 63 by shifting the valve 73, so as to cause the piston 7 to move up with the bait the desired distance. As soon as the piston has reached the desired point the handle 79 is pulled down, thereby admitting high pressure fluid into the cylinder 76, whence it will flow into the collapsible periphery 8 of the piston expanding the same against the inner walls of the glass. At the same time and by the same movement of the rope 78, the clamp carrying the sleeve 82 is clamped onto the piston rod 9ª, thus preventing any further movement of the piston rod 9ª and its piston except as shifted by the operation of the motor 88. During the upward movement of the bait and the piston 7 the valve 86 is opened so as to allow fluid pressure to flow by the pipe 85 into the upper end of the cylinder 63 and thence through the piston rod 9ª into the glass cylinder being formed, below the piston 7. Simultaneously with the arrest of the movement of this piston and the expansion of its periphery the valve 86 is closed, so that thereafter a fixed mass or quantity of fluid, as air, is held within the container, which consists of the portion of the glass cylinder below the piston 7, the tubular piston rod 9ª, the portion of the cylinder 63 above the piston 62, the pipe 85 above the valve 86, and the gasometer. Any variation of pressure desired in the glass cylinder thereafter is obtained, not by any varying of the mass or quantity of air, but by changing the volume of the container. Such change of volume and consequently of pressure can be effected by means of the motor 88 acting either through the clutch 95 and its connected mechanism to shift the piston 7, or through the clutch 90 and attached mechanism to shift the movable member of the gasometer as desired.

The bait consists of a head 96 having a depending flange 97 and a thin sheet metal shell 98 secured to the head by a clamping ring 99. Provision is made for heating and maintaining the heat of this bait by means of wires surrounding the depending flange 97 and connected through the wire ropes 64 to the drums, which are connected to a suitable generator by brushes 100. When using electric means of heating the bait insulating blocks 101 are interposed between the wire ropes and the gimbal ring 66.

The container for isolating or inclosing the mass of fluid for regulating the dimensions of the cylinder may be formed wholly within the cylinder being drawn. Fig. 8 shows such a construction in connection with the apparatus shown in Fig. 1, and to produce such a container a valve 102 adapted to close passage 103 in the plug, is formed on a sleeve 104, which extends down through said passage and is connected to a lever 105, whereby the valve may be raised and lowered to its seat. By closing this valve as soon as the piston has reached the desired position and the peripheral tube 8 of the piston has been expanded, a fixed mass of gas is inclosed entirely within the cylinder being drawn.

In Fig. 6 is shown a construction of piston adapted for use in connection with the apparatus shown in Fig. 2, whereby the container for the regulating fluid pressure is wholly within the cylinder being formed. The flow of air into the glass cylinder is controlled by a suitable valve, as the slide valve 106 carried by the piston 7 and movable by a spring 107 to bring its port into alinement with the pipe 9ª and passage through the piston, permitting fluid to flow from the pipe into the glass cylinder being formed. The stem of the valve is connected to a piston in the cylinder 108, connected to the pipe 77 through which fluid under pressure is introduced into the tubular periphery of the piston to expand it against the inner wall of the glass cylinder. When in this construction the sleeve 82 is clamped to the pipe 9ª arresting the movement of the piston or diaphragm 7, the tubular periphery 8 is expanded and the flow of air into the glass cylinder stopped, so that thereafter the mass or quantity of air within the container formed by the cylinder, piston and the body of glass from which the cylinder is being drawn will remain practically constant.

In Fig. 7 the pot or receptacle from which the glass is drawn is formed in sections i. e., a stool 109 and a bowl 110, the former forming the support and bottom of the bowl. The stool is formed with a radial passage 111 and is supported on a ledge or extension 112 of the forehearth with its passage 111 in register with the outlet passage 113. An annular combustion chamber 114 is formed by the pot or receptacle and a circular wall 115 resting on the ledge or extension 112. This chamber is connected by flues 116 with the combustion chamber in the dog-house 2. The products of combustion escape from the chamber 114 through the flue 118, through which any glass may also escape when the bowl 110 is lifted from its stool. When the bowl is to be renewed the gate 119 is closed, so that only glass in the bowl and above the top of the stool will be wasted.

In Fig. 7 is also shown a construction whereby the pressure of the fluid in the container may be regulated by heat. The heater 120, which is preferably electric, is supported on the sleeve 104, the wires for the circuit of the heater passing down through the sleeve and connecting through a rheostat 121 with a suitable source of current. The heating effect within the cylinder, and the resultant variation in pressure of the inclosed fluid, can be controlled and varied by shifting the arm of the rheostat either by hand or automatically by gears connected through a clutch 122 with gears 24.

By reference to Figs. 1 and 7, it will be seen that the glass flows from the melting chamber through the dog-house 2 to the drawing pots, and that the flow of glass from the melting chamber is controlled by a valve 131 and from the dog-house to the pots by a valve 119. The dog-house or chamber 2 is made sufficiently large to serve as a combustion chamber, gas being introduced by the pipes 132. By properly adjusting the valves 119 and 131 the flow of glass can be regulated and in its flow through the dog-house the temperature of the glass can be varied as required by the conditions of work.

I claim herein as my invention:

1. The method of drawing glass cylinders, which consists in drawing a cylinder of glass from a receptacle, sealing a mass or quantity of fluid in a container including the plastic portion of the cylinder, and varying the pressure of the contained fluid.

2. The method of drawing glass cylinders, which consists in drawing a cylinder of glass from a receptacle, sealing a mass or quantity of fluid in a container including the plastic portion of the cylinder, and changing the capacity of the container without changing the quantity of the contained fluid.

3. In an apparatus for drawing glass cylinders, the combination with drawing mechanism and means for supplying air to the cylinder being drawn, of means for sealing a portion of the cylinder, means for closing the air-supply, and means operative when the air-supply is closed for regulating the pressure of the air in said sealed portion.

4. In an apparatus for drawing glass, the combination of a receptacle for the glass, a diaphragm or piston, means for moving the diaphragm or piston relatively to the receptacle, and means for drawing a shell of glass from the receptacle over the diaphragm or piston.

5. In an apparatus for drawing glass cylinders, the combination of a receptacle for the glass, a piston or diaphragm arranged in suitable relation to the receptacle, means for drawing a shell of glass from the receptacle and over the diaphragm, a fluid receptacle connected to the shell being drawn below the diaphragm, and means for changing the capacity of the receptacle.

6. In an apparatus for drawing glass cylinders, the combination of a receptacle for the glass, a piston or diaphragm arranged in suitable relation to the receptacle, means for drawing a shell of glass from the receptacle and over the diaphragm, a fluid receptacle connected to the shell being formed intermediate of the diaphragm and the glass receptacle, and means for maintaining a uniform pressure of fluid in the fluid receptacle while varying the volume of the contained fluid.

7. In an apparatus for drawing glass cylinders, the combination with drawing mechanism, of a diaphragm having an inflatable periphery and adapted to seal the cylinder being drawn, means for supplying fluid to the periphery of the diaphragm, and means for adjusting the diaphragm.

8. In an apparatus for drawing glass cylinders, the combination of drawing mechanism, a ring movable by the drawing mechanism, and clamping arms carried by the ring and adapted to be shifted thereon to clamp the cylinder being drawn.

9. In an apparatus for drawing glass cylinders, the combination with an annular bait, of a ring pivotally secured to the bait at diametrically opposite points, a drawing mechanism, and connections between the drawing mechanism and the ring secured to the ring at points between said points of pivotal connection.

In testimony whereof, I have hereunto set my hand.

FRANK L. O. WADSWORTH.

Witnesses:
CHARLES BARNETT,
FRANCIS J. TOMASSON.